United States Patent [19]

Giardini

[11] 4,270,643
[45] Jun. 2, 1981

[54] ACCELERATION RESPONSIVE CLUTCH

[75] Inventor: Dante S. Giardini, Dearborn Heights, Mich.

[73] Assignee: Ford Motor Company, Dearborn, Mich.

[21] Appl. No.: 968,946

[22] Filed: Dec. 13, 1978

[51] Int. Cl.³ ............................................. F16D 23/10
[52] U.S. Cl. ................................................. 192/103 C
[58] Field of Search ................... 192/74, 103 B, 103 C

[56] References Cited

U.S. PATENT DOCUMENTS

| 1,762,799 | 6/1930 | Starkey | 192/103 C |
|---|---|---|---|
| 1,998,172 | 4/1935 | Ross | 192/103 C |
| 2,208,865 | 7/1940 | Gette, Jr. | 192/103 C |
| 2,210,459 | 8/1940 | Knöchl | 192/74 |
| 2,258,393 | 10/1941 | Simmonds | 192/103 C |
| 2,509,061 | 5/1950 | Holcomb | 192/103 C |
| 2,513,798 | 7/1950 | Hatfield | 192/103 C |
| 3,618,730 | 11/1971 | Mould | 192/74 |

Primary Examiner—Peter M. Caun
Attorney, Agent, or Firm—Steven L. Permut; Clifford L. Sadler

[57] ABSTRACT

An inertia operated clutch has a rotatable input member and coaxially rotatable output member, with a torque transmitting member which has a mass member connected thereto and a spring biasing the mass member to move the torque transmitting member to one of the torque transmitting or disengaged positions. The mass member is mounted such that angular acceleration of the input member above a predetermined rate causes inertia of the mass to overcome the biasing force of the spring to move the torque transmitting member to the other of the torque transmitting or non-torque transmitting position.

14 Claims, 12 Drawing Figures

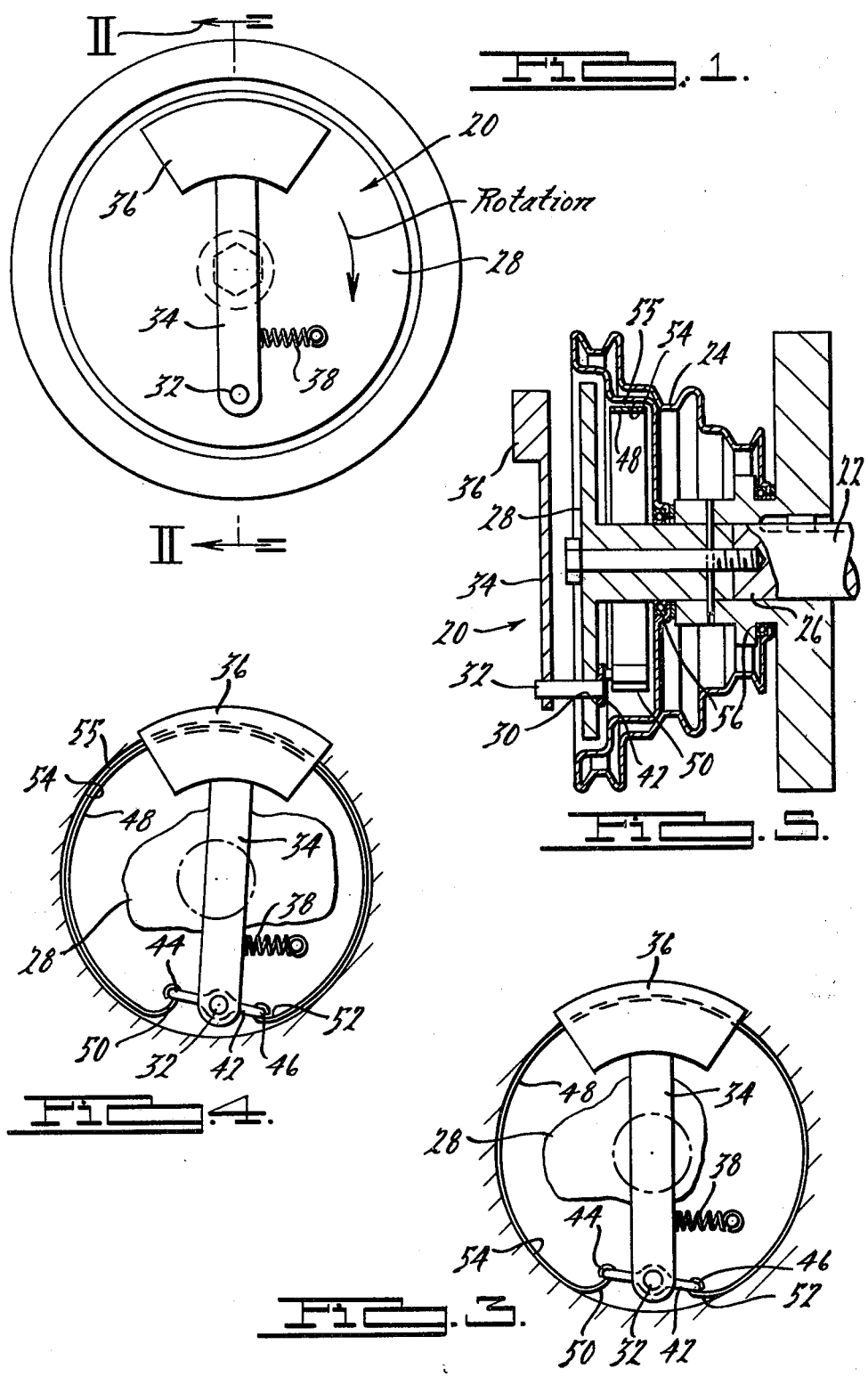

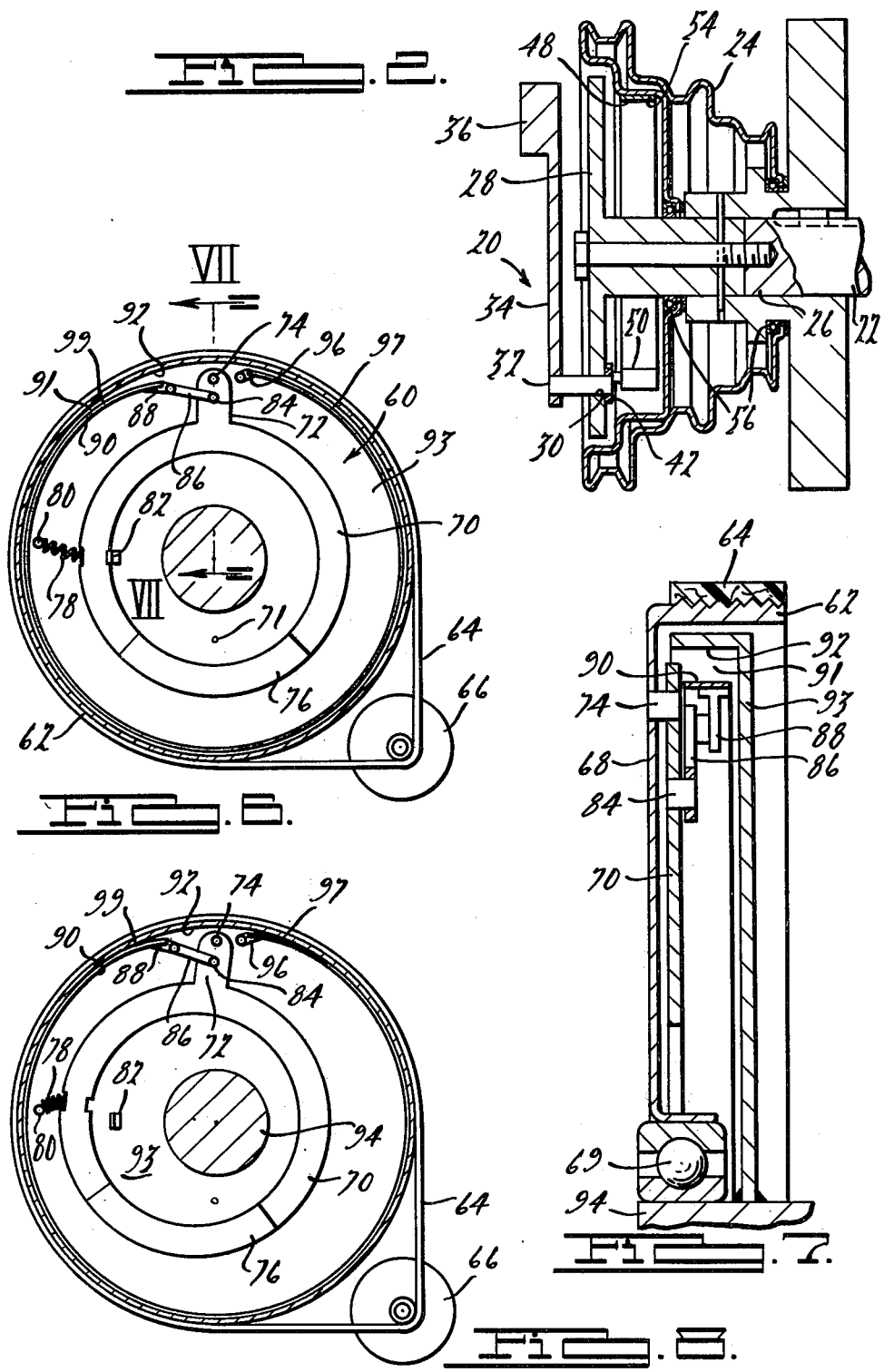

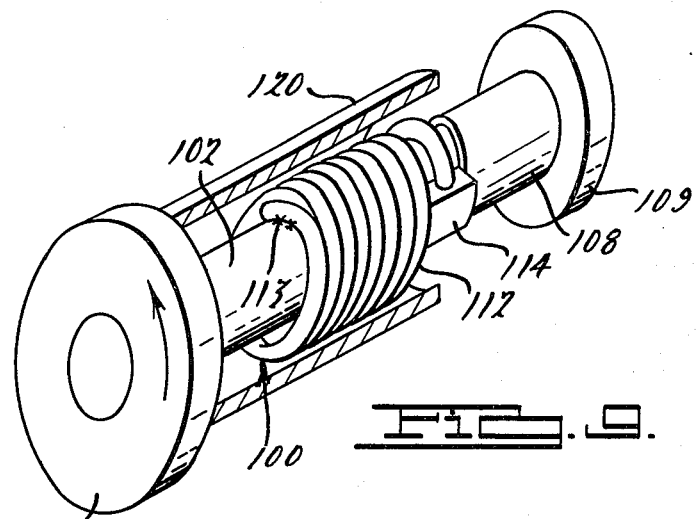
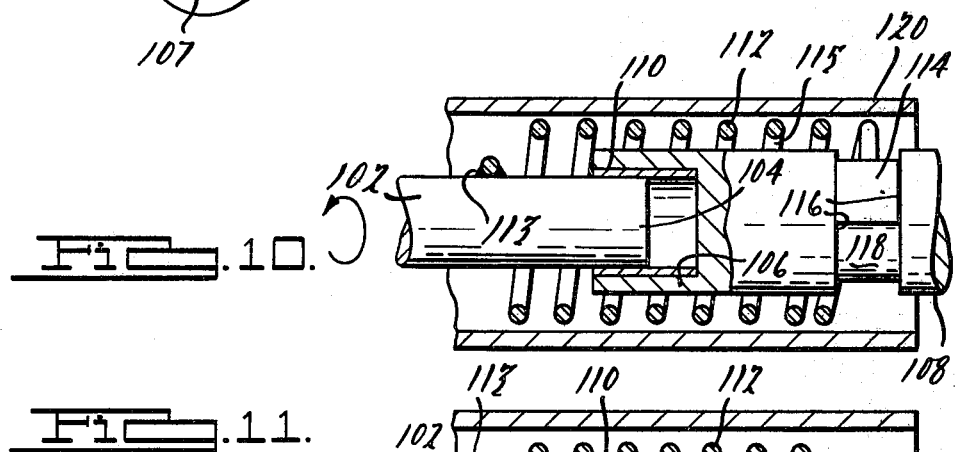
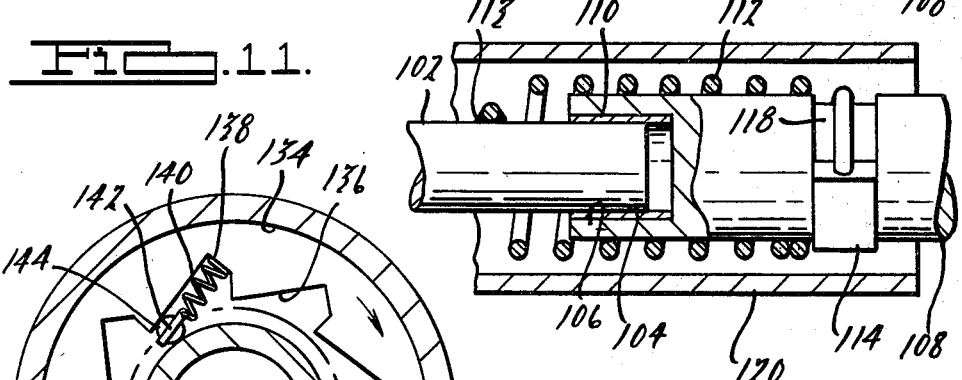
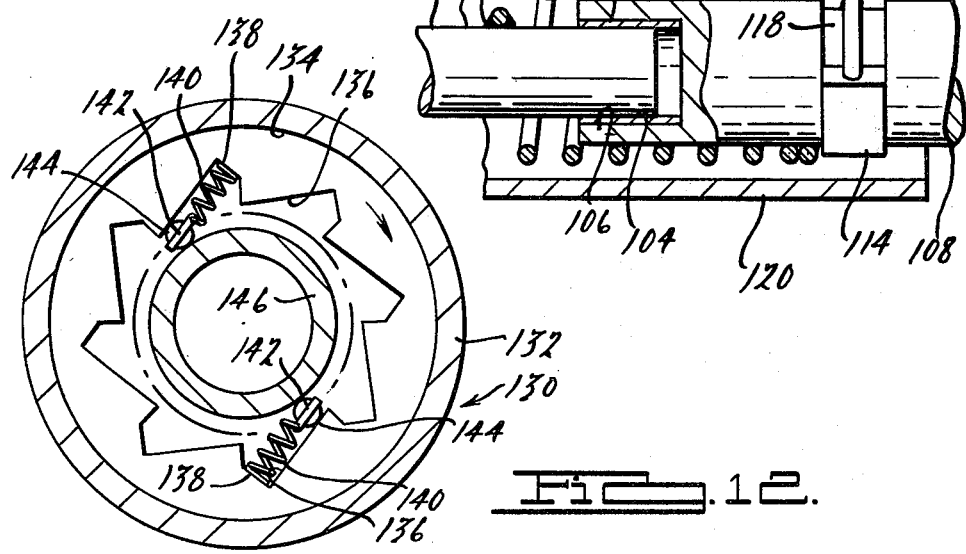

ACCELERATION RESPONSIVE CLUTCH

BACKGROUND OF THE INVENTION

1. Field of the Invention

This invention relates to a torque transmitting clutch assembly and more specifically to a coupler and decoupler mechanism which is responsive to the angular acceleration of a rotating input member. Such a mechanism is useful for automotive vehicles.

2. Description of the Prior Art

One of the key components of any motor driven vehicle is a clutch which selectively couples or decouples a rotating input shaft with an output driven shaft. Clutches of this type have varying structures. One type of structure has a coil spring anchored to the input shaft frictionally engage a drum of the output shaft. One such device is shown in U.S. Pat. No. 1,640,472 to Starkey issued on Aug. 30, 1927. A variation of this coil spring clutch has the output shaft fit within the interior of a coil spring. The coil spring is wound tightly to frictionally engage the output shaft.

Another type of basic structure is the over-running clutch which an input shaft, output drum, and bearings circumferentially placed around the shaft between the shaft and drum. The bearings are wedged into a locked position when the input shaft is rotated in one direction. When the input shaft is rotated in an opposite direction or the output drum rotates faster than the shaft, the bearings disengage from the output shaft. Often the bearings are spring biased to the engaged position. Two such overrunning clutches are disclosed in U.S. Pat. No. 1,642,645 issued to Constantinesco on Sept. 13, 1927 and in U.S. Pat. No. 2,926,765 issued to Heid on Mar. 1, 1960. Overrunning clutches are often utilized in connecting the starter motor with an internal combustion engine.

Slip clutches have been designed to limit the amount of torque which can be transferred from the input shaft to the output shaft. When the torque is above a predetermined amount, slippage occurs which creates a loss of torque. Two such slip clutches are disclosed in U.S. Pat. No. 3,036,447 issued to Wilhelmsson et al on May 29, 1962 and U.S. Pat. No. 2,940,283 issued to Christenson et al on June 14, 1960.

Other types of clutches include a centrifugally actuated mechanism which causes the clutch to engage at a certain predetermined angular velocity of the input shaft by use of weights which are forced outwardly due to rotation of the input shaft. One such clutch is disclosed in U.S. Pat. No. 2,926,765 issued to Heid on Mar. 1, 1960.

No known clutch has been developed which responds, not to the speed to the input member, but to the angular acceleration of the input member. Such a clutch would be greatly advantageous in decoupling automobile accessories at critical times when the power of the engine should be concentrated in accelerating the forward motion of the vehicle. In addition, such a clutch would be greatly advantageous in a starter mechanism in an internal combustion engine which responds to the angular acceleration of the starter motor and automatically shuts off after the starter motor has started the internal combustion engine.

SUMMARY OF THE DISCLOSURE

According to the present disclosure, a clutch is constructed to engage and disengage at a predetermined angular rotatable acceleration of an input shaft. The clutch has a rotatable input member, and a rotatable output member coaxially mounted thereto. An intermediate torque transmitting member is mounted to the rotatable input member for movement between a torque transmitting position with the output member and a disengaging position with the output member. An inertia mass member is attached to the torque transmitting member and is biased to move the torque transmitting member to one of the engaging or disengaging positions. The inertia mass is positioned to overcome the biasing force at a predetermined angular acceleration of the input member to move the said torque transmitting member to the other of transmitting or disengaging positions. The inertia mass is positioned to overcome the biasing force at a predetermined angular acceleration of the input member to move the said torque transmitting member to the other of transmitting or disengaging positions.

In one embodiment, the acceleration responsive clutch connects an internal combustion engine with a starter motor. The inertia operated clutch has its inertia mass attached to the torque transmitting member and biased to move the torque transmitting member to a disengaging position and mounted such that at a predetermined angular acceleration of the input member caused by actuation of the starter motor, the inertia mass overcomes the biasing force to move the torque transmitting means to a torque transmitting position. The output member is rotatably driven to turn a crankshaft of the internal combustion engine.

In another embodiment, an inertia operated clutch is drivingly interposed between a vehicle engine and accessories such as a power steering pump or air conditioning compressor. The clutch has an inertia member attached to a torque transmitting member and biased to move the torque transmitting member to a torque transmitting position. The inertia mass is mounted such that at a predetermined angular acceleration of the input member, the inertia mass overcomes the biasing force to move the torque transmitting member to a disengaging position to decouple accessories from the vehicle engine when the engine is accelerated above a predetermined rate.

BRIEF DESCRIPTION OF THE DRAWINGS

FIG. 1 is a front elevational view of one embodiment of the invention.

FIG. 2 is a side elevational and partially segmented view of the embodiment taken along the line II—II shown in FIG. 1 showing the clutch in the engaged position.

FIG. 3 is a front elevational and fragmentary view of the clutch shown in FIG. 1 in the engaged position.

FIG. 4 is a front elevational and fragmentary view showing the clutch in the disengaged position.

FIG. 5 is a side elevational view similar to FIG. 2 showing the clutch in the disengaged position.

FIG. 6 is a front elevational and partially segmented view of a second embodiment of the invention, showing a clutch in the disengaged position.

FIG. 7 is a fragmentary side elevational segmented view taken along line VII—VII of FIG. 6.

FIG. 8 is a front elevational view of the clutch shown in FIG. 6 shown in the engaged position.

FIG. 9 is a perspective partially segmented view of a third embodiment of the invention.

FIG. 10 is a side elevational segmented view of the embodiment shown in FIG. 9, showing the clutch in the disengaged position.

FIG. 11 is a side elevational segmented view of the clutch on FIG. 9 in the engaged position.

FIG. 12 is a fourth embodiment of the invention shown in the disengaged position.

DETAILED DESCRIPTION OF THE PRESENTLY PREFERRED EMBODIMENTS

Referring now to FIGS. 1 through 5, a clutch 20 selectively couples a crankshaft 22 of a vehicle engine with a coaxially mounted pulley 24 which engages belts (not shown) that drive certain automobile accessories (not shown) such as air conditioning compressors, radiator fans, and pumps. The pulley 24 is rotatably mounted on the crankshaft 22 and the clutch 20 provides an acceleration responsive driving connection between the crankshaft and the pulley.

As shown in FIGS. 2 and 5, the crankshaft 22 has rigidly mounted at its front end 26 a circular disc 28. The disc 28 has an aperture 30 spaced away from its center. A pin 32 rotatably fits within aperture 30. The front end of the pin has a pendulum post 34 rigidly mounted thereto extending upwardly and terminating at a mass member 36 rigidly mounted thereto. As shown in FIGS. 1 and 3, a compression spring 38 abuts the right hand side of the pendulum post and has its other end fixed to the disc 28 to bias the pendulum post to the left.

The pin 32 has its rear end rigidly connected to a link 42. The link 42 has a left end 44 and a right end 46 inclined such that the left end is radially closer to the rotational center of the crankshaft 22 than the right end 46. A clutch band 48 has two ends 50 and 52 which are rigidly connected to the left and right ends 44 and 46 respectively of link 42. The clutch band 48 is sized as shown in FIGS. 1 and 3 to abut an interior drum surface 54 of pulley wheel 24 and frictionally engage it. Torque can be transmitted from the crankshaft 22, through the disc 28 through pin 32 through link 46, through clutch band 48, and to the pulley wheel 24. The pulley wheel 24 has bearings 56 that rotatably support it on the crankshaft 22.

In operation, as the crankshaft rotates at a constant speed, as shown in FIG. 3 in the clockwise direction, spring 38 biases the pendulum post 34 to move the linkage 42 such that the end 50 and a substantial portion of clutch band 48 engage the interior drum surface 54. Upon a predetermined rate of angular acceleration of the crankshaft, the inertia force of the mass member 36 will overcome the biasing forces of the spring 38 to move the mass 36 as shown in FIG. 4, to the right in a clockwise direction. The inertia of the mass 36 causes the post 34 to pivot about its pivot pin 32 which, in turn, pivots link 42 about pivot pin 32.

Link 42 when pivoted, as shown in FIG. 4, has its end 46 approach drum surface 54 and move clockwise with respect to the axis of disc 28. End 44 radially moves inward and counterclockwise with respect to the axis of disc 28. The ends 44 and 46 move closer together along the horizontal component as shown in FIG. 4. The result of such movement of link 42 contracts the overall diameter of the clutch band 48 such that the clutch band 48 disengages from the interior drum surface 54 as shown in FIGS. 4 and 5 and forming gap 55 therebetween. When the angular acceleration is below the predetermined amount, the spring will again bias the pendulum post 34 and mass member 36 such that the linkage 42 causes the overall diameter of the clutch band 48 to expand and radially force the band 48 outward to frictionally engage the interior drum surface 54.

In this fashion, an engine when in the accelerating mode can decrease its load by disengaging the accessory drive pulley wheel by use of the above-described acceleration responsive clutch.

Another embodiment of the invention is disclosed in FIGS. 6 through 8. In this embodiment, a clutch 60 is constructed to be interposed between a starter motor and a vehicle engine. The clutch 60 transmits torque when the rotatable input member has a predetermined rate of angular acceleration and disengages when the angular acceleration rate is below the predetermined level. The clutch 60 has an input rotatable drum 62 which is belt driven by belt 64 connected to a starter motor 66 as shown in FIG. 6. The input drum 62 has a disc section 68 as shown in FIG. 7 rotatably mounted by bearings 69 on the crankshaft 94 of a vehicle engine. Rotatably mounted to the disc 68 is a ring shaped mass 70 which functions as an inertia member. The ring member 70 has an integral tab portion 72 pivotably mounted to the disc 68 through a pivot pin 74. The center of mass 71 of the ring member 70 is positioned radially opposite the pivot pin 74 from the center of rotation of the drum 62 by placement of most of the weight of the member 70 within section 76. A spring 78 is anchored to a flange 80 rigidly mounted to the disc 68. The spring 78 abuts the ring mass member and biases it to the right as shown in FIG. 6. A stop 82 defines the counterclockwise limit (relative to pivot pin 74) of the movement the ring member 70 under the force of the spring 78.

Radially inward of pivot 74 is, as shown in FIG. 7, pin 84 which rigidly connects ring member 70 to link 86. Link 86 is rigidly connected to end 88 of clutch band 90 forming a heel section 99 of band 90. Clutch band 90 is fitted within drum 93 which is rigidly mounted to crankshaft 94. The band 90 normally disengaged from interior surface 92 of drum 93 under the bias of spring 78 on inertia member 70, as will be described.

In operation, when the starter motor is inactive the ring member 70 is positioned to retract the end 88 of clutch band 90 radially inward to form a gap 91 between the clutch band 90 and the drum surface 92 as shown in FIG. 7. When the starter motor 66 is actuated, the drum 62 undergoes angular clockwise acceleration. The inertia of ring member 70 overcomes the biasing force of spring 78 and moves to the left (i.e., clockwise relative to pivot pin 74) as viewed in FIGS. 6 and 8. Link 86 is, thereby, displaced to the left and radially outward in turn pushes end 88 of clutch band 90 radially outward to cause heel section 99 of band 90 to frictionally engage the interior drum surface 92. Torque is transmitted from starter motor 66, through belt 64, the drum 62, disc section 68, pin 74, tab portion 72 of inertia member 70, pin 84, band 90 and drum 93 to crankshaft 94.

When the crankshaft 94 is turned and the internal combustion engine is started such that the crankshaft 94 obtains a rotation speed faster than the output drum 62, torque transmission is lost because the interior surface 92 of drum 93 is frictionally slipping past the toe section 97 of band 90 than having heel section 99 frictionally grabbing surface 92. At this point, the engine is running and starter motor 66 is shut off manually. The ring member 70 swings to its initial disengaged position as shown in FIG. 6. In this fashion, the clutch 60 can be used to start an internal combustion engine.

Reference now is made to FIGS. 9 through 11, to describe a third embodiment of an inertia clutch assembly 100 with a coil spring clutch element 112 which is constructed to provide an inertia sensitive drive connection between an input shaft 102 and an output shaft 108. The clutch 100 has an output shaft 102 with an end 104 that is rotatably received in drum end 106 of a coaxially aligned larger diametered output shaft 108. A low friction bushing 110 rotatably mounts the end 104 within the drum end 106. Fly wheel 107 is attached to shaft 102 and fly wheel 109 is attached to shaft 108.

A coil spring 112 is anchored to the input shaft at 113. The coil spring 112 has an internal diameter sized to receive therein drum end 106 of the output shaft 108 with a slight clearance 115 therebetween. At the end of coil spring 112 is a weight 114. The weight 114 is fitted between two annular shoulders 116 which form a portion of a groove 118 in the output shaft. The output shaft is lubricated at groove 118 to reduce friction with the weight 114. A bearing assembly (not shown) can be used instead of lubrication. A cylindrical housing 120 attached to fly wheel 107 retains the weight 114 in a radially fixed position. Lubrication reduces any frictional contact between the weight 114 and the cylindrical housing 120.

As shown in FIG. 10, when the input member is stationary or rotates at a constant speed, a clearance 115 exists between the coil springs 112 and the output member 108 such that no torque is transmitted thereto. However, when rotational acceleration occurs in the input shaft in a counterclockwise direction as viewed in FIG. 10, the inertia of weight 94 tends to cause it to lag behind the angularly accelerating input coil spring 112 to cause coil spring 112 to tighten about output shaft 108 to frictionally engage it and transmit torque from the input shaft 102 through the spring 112 to the output shaft 108 as shown in FIG. 11.

Reference now is made to FIG. 12 in describing a fourth embodiment. An overrunning clutch assembly 130 has an input drum 132. The drum 132 has at its interior surface 134 a plurality of ramps 136 which, in part, extend radially inward. Tension spring 140 is anchored at the end 138 of each ramp 136. The other end of the tension spring 140 is anchored to a bearing housing 142 containing a ball bearing like clutch element 144. An output shaft 146, is coaxial within the drum 132, is spaced from the ramps 136 and drivingly engageable by the clutch elements 144. The tension springs 140 normally pull the clutch elements 144 out of driving engagement with the output shaft 146. This non-driving arrangement exists when the input shaft which drives the drum 132 is stationary or rotating in a clockwise direction shown in FIG. 12 at a constant rotational velocity (i.e., the shaft is not accelerating).

However, when the input drum 132 is angularly accelerating, the inertia of the housings 142 and clutch elements 144 overcomes the force of the springs 140 causing the clutch elements 144 to lag behind and to become wedged between the ramp 136 and the surface of output shaft 146 thereby locking the input drum 132 torsionally with the output shaft 146. When the output shaft 146 is rotating clockwise in a faster direction than the input shaft, the clutch elements 144 are released such that no torsion is transfered from the output shaft 146 to the input drum 132. In addition, when the input drum 132 stops accelerating and returns to a constant angular speed, the spring 140 pulls the clutch elements 144 out from the wedged position to disengage input drum 132 from the output shaft 146.

In this fashion, an overrunning clutch that is acceleration sensitive is provided.

Variations and modifications of the present invention are possible without departing from its scope and spirit as defined by the appended claims.

The embodiments of the invention in which an exclusive property or privilege is claimed are defined as follows:

1. An acceleration responsive clutch comprising:
   a rotatable input member,
   a rotatable output member mounted coaxially with respect to said input member,
   torque transmitting means connected to said rotatable input member and constructed for selective movement between a first engaged position such that a torque is transmittable from said input member to said output member and a second disengaged position such that torque is not transmittable from said input member to said output member,
   an inertia member attached to said torque transmitting means;
   biasing means for biasing said inertia member to move said torque transmitting means to one of said first and second positions; and
   said inertia member being constructed to overcome said biasing means in response to a predetermined rate of angular acceleration of said input member to move said torque transmitting means to the other of said first and second positions.

2. An acceleration responsive clutch as defined in claim 1 wherein said torque transmitting means comprises a clutch circumferentially fitted about the axis of rotation of said input member and constructed to engage a cylindrical surface of said output member.

3. An acceleration responsive clutch as defined in claim 2 wherein said clutch band fits within a drum of said output member for frictional engagement with the interior cylindrical surface of said drum when in said first engaged position.

4. An acceleration responsive clutch as defined in claim 3 further comprising:
   a mount pivotably mounting said inertia member to said input member;
   said mount being radially spaced from the axis of rotation of said input member;
   the center of mass of said inertia member being radially spaced with respect to the axis of rotation from said mount; and
   said biasing means abuts said inertia member radially spaced with respect to said axis of rotation from said mount.

5. An acceleration responsive clutch as defined in claim 4 wherein said clutch band is connected at one end thereof to the input member adjacent said interior cylindrical surface of said drum;
   a link has one end connected to said inertia member radially spaced from said mount mounting said member to said input member,
   said link has its other end connected to the other end of said clutch band.

6. An acceleration responsive clutch as defined in claim 4 wherein:

a link having its ends connected to the ends of said clutch band;

said link is rigidly mounted at said pivot mount to said inertia member in a radially and circumferential direction with respect to said axis of rotation with a leading end of said link radially inward of its trailing end;

said biasing means biases said inertia member to position said clutch band in said first engaged position when input member is angularly accelerating below said predetermined rate;

said inertia member is constructed to overcome the force of said biasing means and to displace said clutch band to said second disengaged position when said input member is angularly accelerating over said predetermined rate.

7. An acceleration responsive clutch as defined in claim 2 wherein;

said torque transmitting means comprise a multiple turn coil spring wrapped about and anchored to said input member, said output member having a shaft section coaxially received within coils of said coil spring with a slight clearance fit therebetween;

said inertia member is attached to said coil spring and rotatable with spring and said input shaft, said inertia member being constructed to exert a force on said coil spring causing said spring to tighten about said output member in torque transmitting engagement therewith when the rate of angular acceleration of said input member exceeds said predetermined rate.

8. An acceleration responsive clutch as defined in claim 2 comprising:

a pivot means pivotably connecting said inertia member to said input member radially spaced from the axis of rotation of said input member;

the center of mass of said inertia member being radially spaced from said pivot means;

said biasing means abutting said inertia member radially spaced with respect to said axis of rotation from said pivot means.

9. An accleration responsive clutch as defined in claim 1 wherein:

said input member has circumferentially spaced ramps inclined toward the rotatable surface of the output member;

said inertia member and torque transmitting means comprise a plurality of clutch elements and spring means biasing said elements to said second disengaged position; and said elements being displaceable to said first engaged position against the bias of said spring means in response to a rate of angular acceleration of said input member that exceeds said predetermined rate whereby said clutch elements are wedged between the ramps and rotatable surface of the output member.

10. An acceleration responsive clutch as defined in claim 4 or 8 wherein:

said biasing means biases said inertia member to position said clutchband in said second disengaged position when said input member is angularly accelerating below said predetermined rate;

said inertia member is constructed to overcome the force of said biasing means to displace said clutchband to said first engaged position when said input member is angularly accelerating over said predetermined rate.

11. An accelerator responsive clutch as defined in claim 1 wherein:

said biasing means biases said inertia member to position said clutchband in said second disengaged position when said input member is angularly accelerating below said predetermined rate;

said inertia member is constructed to overcome the force of said biasing means to displace said clutchband to said first engaged position when said input member is angularly accelerating over said predetermined rate.

12. An acceleration responsive clutch as defined in claim 1 wherein:

said biasing means includes a spring being anchored to said input member and exerting a biasing force on said inertia member.

13. An acceleration responsive clutch for an internal combustion engine with a starter motor, the clutch comprising:

a rotatable input member operably connected to said starter motor;

a rotatable output member operably connected to a crankshaft of said engine;

torque transmitting means connected to said input member for movement between a first engaged position such that torque is transmittable from said input member to said output member and a second disengaged position such that torque is not transmittable from said input member to said output member;

an inertia member connected to said torque transmitting means;

biasing means for biasing said inertia member to move said torque transmitting means to said second disengaged position;

said inertia mass being constructed to overcome said biasing means in response to a predetermined rate of angular acceleration of said input member caused by actuation of said starter motor to move said torque transmitting means to said first engaged position to rotate said output member and crankshaft.

14. A decoupler clutch for a vehicle engine having an engine driven accessory, the decoupler clutch comprising;

a rotatable input member drivingly connected to the output of said vehicle engine and construct to rotate at a speed proportional to the speed of said engine;

a rotatable output member operably connected to said depending accessories;

torque transmitting means connected to said input member for movement between a first engaged position such that torque is transmittable from said input member to said output member and a second disengaged position such that torque is not transmittable between said input member and said output member;

an inertia member connected to said torque transmitting means;

biasing means for biasing said inertia member to move said torque transmitting means to said first engaged position;

said inertia mass member being constructed to overcome said biasing means in response to a predetermined rate of angular acceleration of said engine driven input member to move said torque transmitting means to said second disengaged position to decouple said accessory from said engine when the output of said engine is angularly accelerating at a rate in excess of a predetermined rate.

* * * * *